United States Patent
Poveda et al.

(10) Patent No.: US 7,589,602 B2
(45) Date of Patent: Sep. 15, 2009

(54) ANTENNA SWITCH MODULE

(75) Inventors: Patrick Poveda, Villedomer (FR); Francois Dupont, Tours (FR)

(73) Assignee: STMicroelectronics S.A., Montrouge (FR)

( * ) Notice: Subject to any disclaimer, the term of this patent is extended or adjusted under 35 U.S.C. 154(b) by 220 days.

(21) Appl. No.: 11/490,740

(22) Filed: Jul. 21, 2006

(65) Prior Publication Data

US 2007/0018753 A1    Jan. 25, 2007

(30) Foreign Application Priority Data

Jul. 22, 2005   (FR)   ................................. 05 52276

(51) Int. Cl.
*H01P 1/10* (2006.01)
*H01P 5/12* (2006.01)
*H04B 1/44* (2006.01)
*H04B 1/46* (2006.01)

(52) U.S. Cl. ........................... 333/103; 455/78; 455/82; 333/101

(58) Field of Classification Search .................. 333/101, 333/103, 104, 124, 136, 262; 455/78–83
See application file for complete search history.

(56) References Cited

U.S. PATENT DOCUMENTS

| | | | |
|---|---|---|---|
| 7,005,940 B2* | 2/2006 | Kodim | 333/101 |
| 7,239,853 B2* | 7/2007 | Kearns | 455/83 |
| 7,337,547 B2* | 3/2008 | Yasuda et al. | 333/103 |
| 2002/0127973 A1* | 9/2002 | Furutani et al. | 455/82 |
| 2004/0022211 A1 | 2/2004 | Conti | |
| 2006/0141943 A1* | 6/2006 | De Graauw | 455/78 |

OTHER PUBLICATIONS

French Search Report from French Patent Application 05/52276, filed Jul. 22, 2005.

* cited by examiner

*Primary Examiner*—Rexford N Barnie
*Assistant Examiner*—Dylan White
(74) *Attorney, Agent, or Firm*—Lisa K. Jorgenson; William R. McClellan; Wolf, Greenfield & Sacks, P.C.

(57) ABSTRACT

An antenna switch module between several radio-frequency transmit and/or receive paths including, between a common terminal on the antenna side and an access capacitor specific to each path, at least one diode, the number of diodes directly connected to the common terminal being odd and the number of diodes having their cathode on the common terminal side being equal, with a difference of one, to the number of diodes having their anode on the common terminal side.

13 Claims, 3 Drawing Sheets

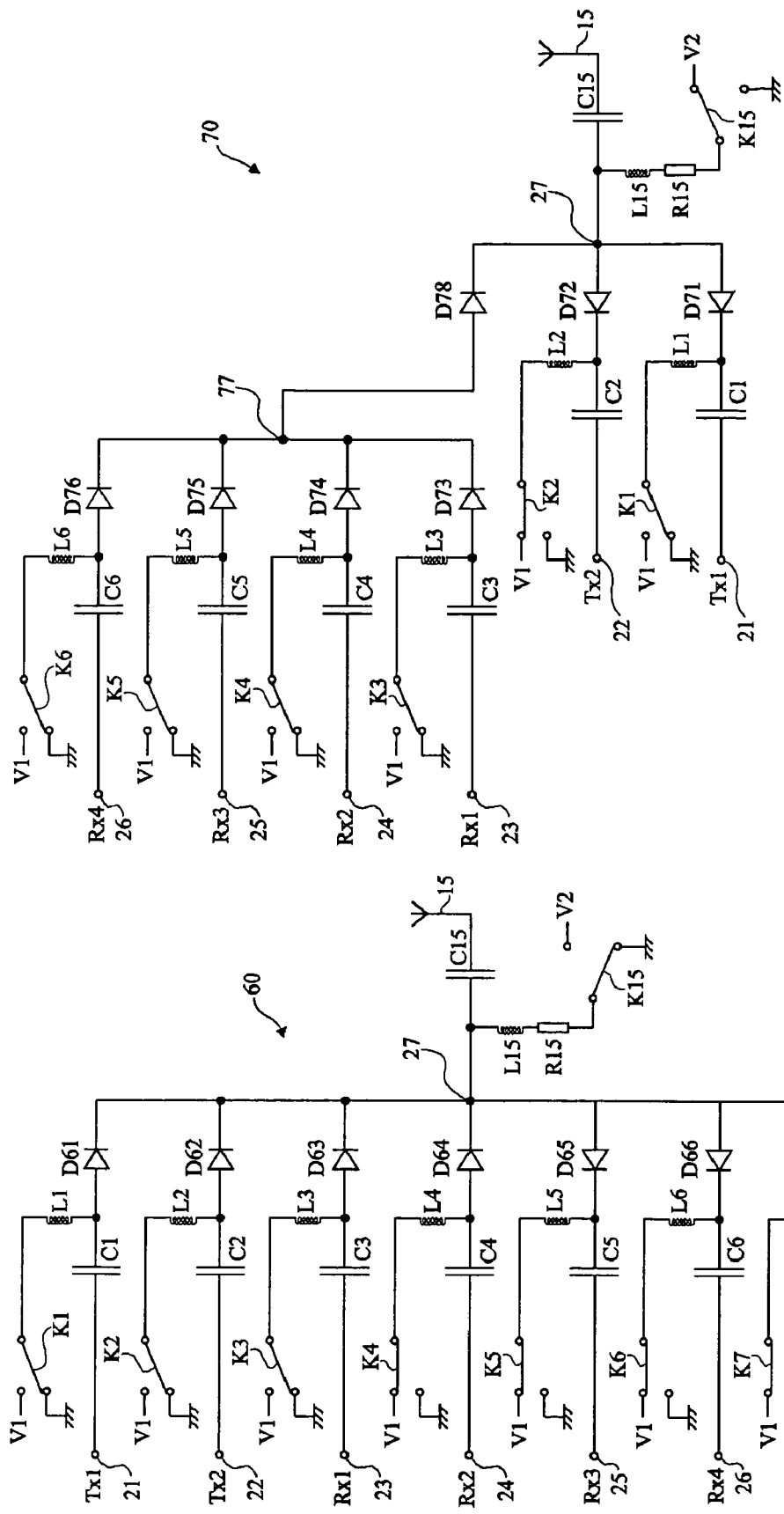

ANTENNA SWITCH MODULE

BACKGROUND OF THE INVENTION

1. Field of the Invention

The present invention relates generally to antenna switch modules which are used to have a same antenna shared by different paths of a radio-frequency electronic transceiver device.

The present invention more specifically applies to cellular phone type mobile telephony devices that are capable of operating over different frequency bands.

2. Discussion of the Related Art

FIG. 1 is a schematic block diagram of a conventional example of a multistandard mobile phone 1 capable of operating in different frequency bands (GSM-900 MHz, DCS-1800 MHz, PCS-1900 MHz).

For simplification, not all the elements of mobile phone 1 have been shown in FIG. 1. Such a mobile phone is generally powered by a battery (not shown) and comprises one or several radio-frequency signal processing electronic circuits 11 (RF) (generally called radio-frequency transceiver heads) comprising as many transmit-receive paths as there are frequency bands capable of being processed by the phone. The radio-frequency transceiver heads (circuit 11) comprise filtering elements, not shown, adapted to each involved frequency band. In FIG. 1, it is assumed that circuit 11 comprises two transmit paths Tx GSM and Tx DCS/PCS intended for GSM and DCS or PCS transmissions, and three receive paths Rx GSM, Rx DCS, and Rx PCS intended for GSM, DCS, and PCS receptions. In practice, the DCS and PCS transmit paths may be confounded, due to their closeness in frequency.

An antenna switch module 2 (ASM) comprises as many input/output terminals 21, 22, 23, 24, and 25 as the transceiver head circuit comprises paths. Switch 2 selectively connects one of terminals 21 to 25 to a common terminal 27 connected to an antenna 15 of telephone 1.

A first known type of antenna switch module uses a so-called "quarter wave" technology in which high-frequency diodes are combined with λ/4 series impedances (one quarter of the wavelength of the central frequency of the frequency band of the involved path) to perform the switching.

High-frequency diodes are characterized by the fact that their semiconductor junction (PN) is made to avoid rectifying the signal at relatively high frequencies (typically, several hundreds of MHz). Such diodes exhibit high minority carrier lifetimes. Thus, when they are forward biased, even under a low continuous biasing, the diodes conduct the RF signals in both directions, without rectifying them, since they do not have time to block on high-frequency biasing inversions. Conversely, when they are reverse-biased or even at 0 V, due to their low capacitance, the diodes block the RF signals. In practice, such diodes are formed with an intrinsic area (PIN diodes), for example, in an epitaxial layer.

The diodes are used to control the conduction of the paths in the transmit direction (Tx) while the quarter-wave circuits are used as filtering elements for blocking the transmit signals Tx which are not intended for paths Rx.

A disadvantage of circuits combining high-frequency diodes and quarter-wave impedances is that they require many passive elements and many diodes, which increases the bulk.

Another disadvantage is that the presence of the quarter-wave impedances in series increases insertion losses of the antenna switch module.

However, such a structure has the advantage of not generating too many harmonics capable of corrupting the useful signals.

FIG. 2 shows a second conventional example of a so-called "common cathode" antenna switch module 2.

This switch comprises, between terminal 27 intended to be connected to antenna 15 and each terminal 21 to 25 intended to be connected to a radio-frequency transceiver head of circuit 11, a high-frequency diode D1, D2, D3, D4, or D5 having its cathode connected to terminal 27. For simplification, the transmit and receive paths will be designated hereafter as Tx1, Tx2, etc. and Rx1, Rx2, Rx3, etc.

In practice, between each terminal 21-25 and the anode of the concerned diode, a connection capacitor C1, C2, C3, C4, C5 is present. Further, each anode is connected to a bias circuit formed of an inductive and/or resistive element L1 to L5 in series with a switch K1 to K5 to individually control the biasing of the different diodes by applying thereto either a positive voltage V+, or the ground or a negative voltage. On the side of antenna 15, a connection capacitor C15 connects terminal 27 to the antenna, and an inductive element L15 in series with a resistor R15 grounds terminal 27. The selection of the path (for example, Tx1) is performed by applying a positive voltage V+ on the anode of its diode (for example, D1) to bias it forward while the other diodes are all reverse-biased and block the other paths. Voltage V+ must be sufficient to turn on a junction (at least on the order of 0.7 volt) and is in practice a positive voltage available in the device (for example, 2.7 volts). Resistor R15 is used to dissipate the D.C. component (voltage V+ decreased by approximately 0.7 volt) of terminal 27. This dissipation may be transferred (partially or totally) onto resistors in series with inductances L1 to L5.

An advantage of a circuit with common cathodes is that it is less bulky, due to the small number of passive components with respect to the preceding solution.

However, a disadvantage is that each blocked diode (and thus four diodes out of five in the example of FIG. 2) generates harmonics of order 2 having non-negligible amplitudes when the selected path is a transmit path.

A first solution for reducing these harmonics is to increase the resistivity and the thickness of the epitaxial layer of the diodes. This however increases switch insertion losses.

A second solution would be to apply negative biasings to the diodes which are desired to be reverse-biased to improve their blocking. This however requires negative and positive bias voltages, while the two biasings are not necessarily available in the concerned devices. Such is especially the case for mobile phones.

SUMMARY OF THE INVENTION

The present invention aims at overcoming all or part of the disadvantages of known antenna switch modules.

The present invention particularly aims at decreasing the harmonics, especially of order 2, in a diode-type antenna switch module.

The present invention also aims at providing a solution which does not increase the bulk of the antenna switch module.

The present invention also aims at providing a solution avoiding simultaneous use of positive and negative bias voltages on the diodes.

To achieve all or part of these objects as well as others, the present invention provides an antenna switch module between several radio-frequency transmit and/or receive paths comprising, between a common terminal on the antenna side and an access capacitor specific to each path, at least one diode, the number of diodes directly connected to said common terminal being odd, and the number of diodes having their cathode on the common terminal side being equal, with a difference of one, to the number of diodes having their anode on the common terminal side.

According to an embodiment of the present invention, the diodes are distributed so that, when a transmit path is selected, the number of diodes of the other paths having their anodes connected to the common terminal is equal to the number of diodes of the other paths having their cathodes connected to the common terminal.

According to an embodiment of the present invention, each path comprises a circuit for biasing the diode which is associated thereto to only bias it forward when this path is selected.

According to an embodiment of the present invention, a bias circuit connects the common terminal to a voltage compatible with the conduction of the diode of the selected path.

According to an embodiment of the present invention, each bias circuit selects one voltage out of two.

According to an embodiment of the present invention, the two bias voltages are identical for all paths.

According to an embodiment of the present invention, the bias voltage of the diodes having their anodes connected to the common terminal is greater than the bias voltage of the diodes having their cathodes connected to the common terminal.

According to an embodiment of the present invention, at least one of said diodes connected to said common terminal is common to a first group of paths, each path in the group comprising a diode which is specific thereto between its access terminal and said common diode.

The foregoing objects, features, and advantages of the present invention, as well as others, will be discussed in detail in the following non-limiting description of specific embodiments in connection with the accompanying drawings.

BRIEF DESCRIPTION OF THE DRAWINGS

FIG. 6 shows a second embodiment of an antenna switch module according to the present invention; and FIG. 7 shows a third embodiment of an antenna switch module according to the present invention.

DETAILED DESCRIPTION

Figure 1:
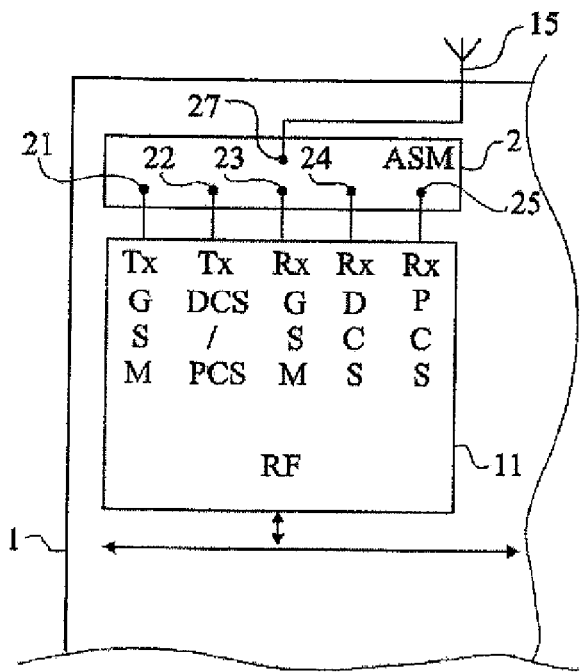
FIG. 1, previously described, is a schematic block diagram of an example of an electronic device comprising an antenna switch module of the type to which the present invention applies.

The same elements have been designated with the same reference numerals in the different drawings. For clarity, only those elements which are useful to the understanding of the present invention have been shown in the drawings and will be described hereafter. In particular, the actual transceiver elements connected between the radio-frequency signal exploitation circuits and the switch have not been described in detail, the present invention being compatible with any conventional circuit. Similarly, the circuits for generating the bias voltages of the radio-frequency diodes have not been described in detail, the present invention being here again compatible with conventional circuits for generating D.C. bias voltages.

A feature of an embodiment of the present invention is to provide high-frequency diodes in both direction, that is, certain diodes have their cathode on the antenna side, and other diodes have their anode on the antenna side. The number of diodes having their cathode on the antenna side is equal, with a difference of one, to the number of diodes having their anode on the antenna side.

Figure 2:
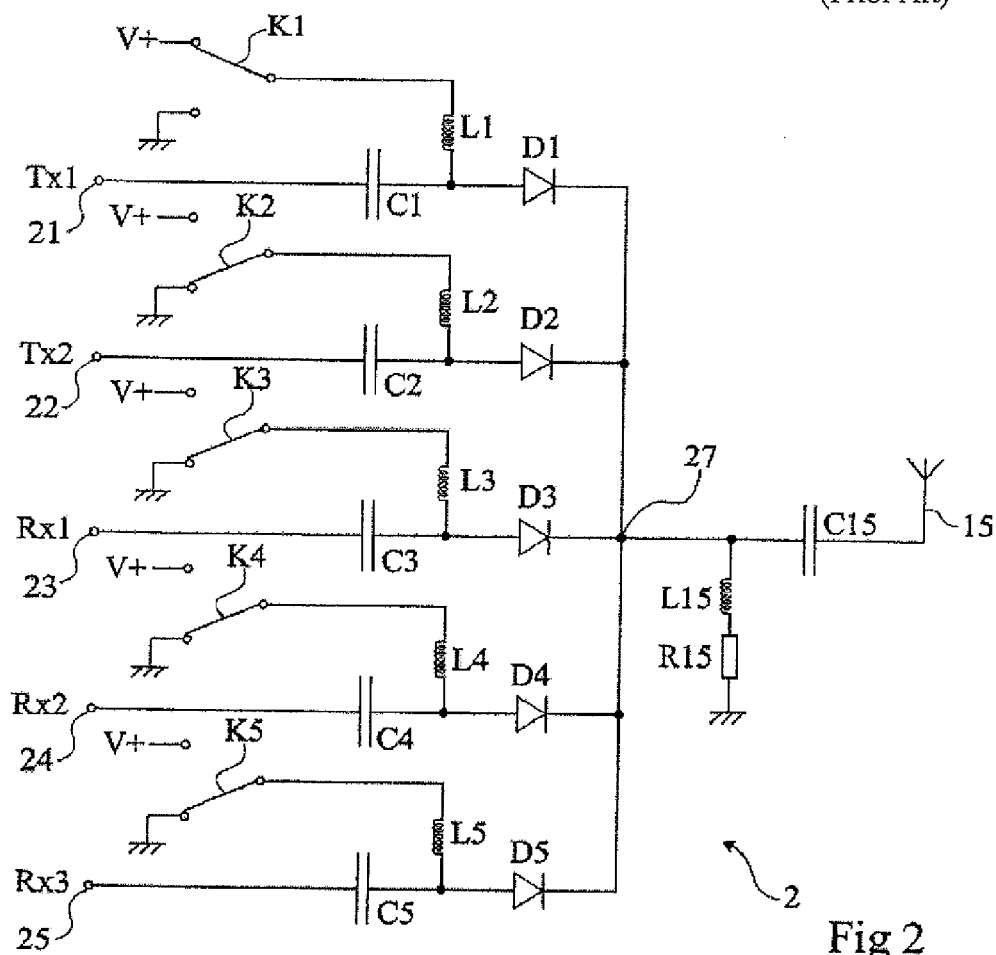
FIG. 2, previously described, shows a conventional example of an antenna switch module with diodes.
Figure 3:
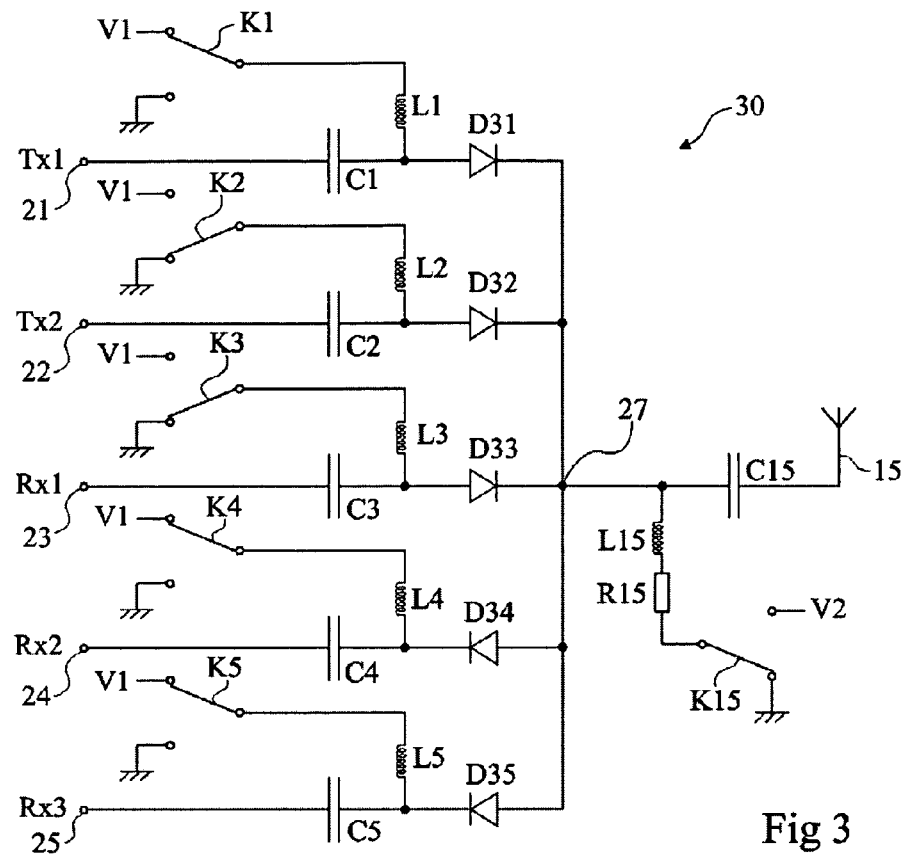
FIG. 3 shows a first embodiment of an antenna switch module according to the present invention.

FIG. 3 shows an embodiment of an antenna switch module 30 according to the present invention. As in FIG. 2, five terminals 21 (Tx1), 22 (Tx2), 23 (Rx1), 24 (Rx2), and 25 (Rx3) connected to the radio-frequency transceiver heads (11, FIG. 1) and a terminal 27 connected, by a connection capacitor C15, to antenna 15 can be found.

According to this embodiment of the present invention, connection capacitors C1 to C5, in series with high-frequency diodes D31 to D35, respectively connect terminals 21 to 25 to terminal 27. Among the diodes, three diodes D31, D32, and D33 respectively assigned to the first three paths (Tx1, Tx2, and Rx1) have their cathodes connected to terminal 27, and two diodes D34 and D35 respectively assigned to the fourth and fifth paths (Rx2 and Rx3) have their anodes connected to terminal 27.

Each diode is associated with a bias circuit formed, for example, of an inductive and/or resistive element L1 to L5 in series with an element (for example, a switch K1 to K5) for selecting one voltage out of two (for example, a positive voltage V1 and the ground), one of the voltages enabling forward biasing of the diode and the other voltage enabling blocking said diode. The bias circuits apply the voltages respectively to the anodes of diodes D31, D32, and D33 and to the cathodes of diodes D34 and D35. On the side of terminal 27, a bias circuit formed, for example, of an inductive and/or resistive element L15 or R15 in series with an element (for example, a switch K15) for selecting between a positive voltage V2 and the ground, forms a current source for absorbing the D.C. component of terminal 27, the voltage of the cathodes of diodes D31, D32, and D33 and of the anodes of diodes D34 and D35 being set by the forward-biased diode. As a variation, this D.C. component is absorbed (partially or totally) by the individual bias circuits of the paths.

For positive voltages, voltages V1 and V2 are of at least approximately 0.7 volt (for example, approximately 2.7 volts) to bias the diode of the selected path forward. The assembly transposes to all-negative voltages, which are then at most −0.7 volt.

The selection elements are controlled by a circuit, not shown, according to the path to be selected. The control of the bias circuits results in that, apart from the diode assigned to the selected path which should be forward biased, the other diodes are reverse-biased to block the radio-frequency signals. In the example of FIG. 3, it is assumed that the selected path is path Tx1. The ground is selected by switch K15 and voltage V1 is applied to the anode of diode D31 which is thus forward-biased. This diode imposes a D.C. component of approximately V1-0.7 volt on terminal 27. Diodes D32 and D33 are reverse-biased (blocked) by application of the ground voltage on their respective anodes while diodes D34 and D35 are blocked by application of voltage V1 on their respective cathodes.

As previously, each blocked diode will generate harmonics which will add with those of the other reverse-biased diodes.

However, when the selected path is a transmit path, each reverse-biased diode is in a way in antiparallel with another reverse-biased diode so that their respective harmonics are in phase opposition. If the diodes have a stable harmonic rate in the range of D.C. components seen by the reverse-biased diodes (approximately V1-0.7 volt for diodes D32 and D33, approximately 0.7 volt for diodes D34 and D35), these harmonics are of same amplitude and mutually cancel. In other words, as seen from terminal 27, without taking into account the transmit diode assigned to the selected path, there are as many diodes in one direction as in the other. For the last two conditions to be respected, the total number of diodes directly connected to terminal 27 is odd and there is, with a difference of one, the same number of diodes in each direction.

Figures 4A, 5A:
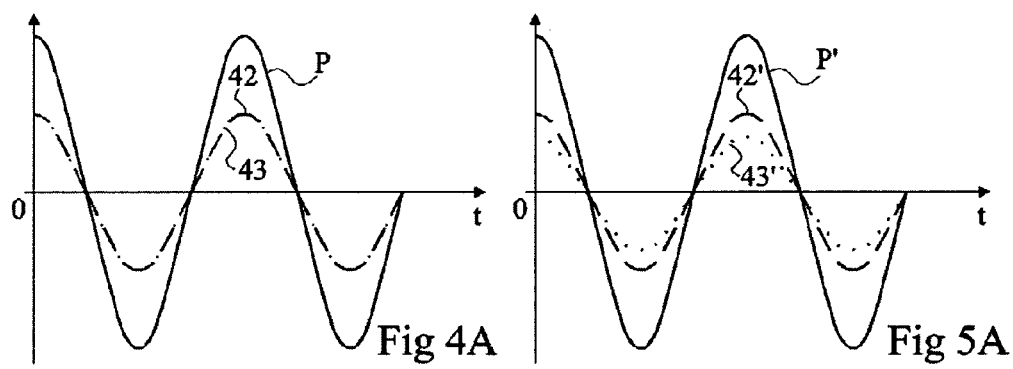
FIGS. 4A and 4B illustrate the operation of an antenna switch module according to a preferred embodiment of the present invention.
FIGS. 5A and 5B illustrate the operation of an antenna switch module according to a preferred embodiment of the present invention.
Figures 4B, 5B:
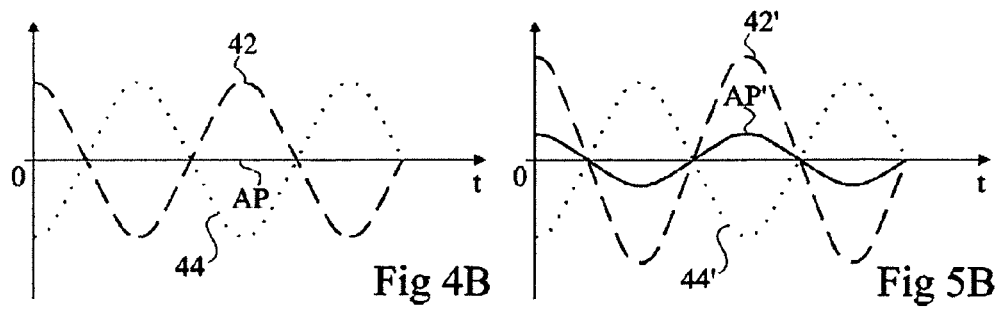

FIGS. 4A and 4B illustrate this operation. For simplification, it is assumed to be in the presence of a single-frequency sinusoidal signal. In FIG. 4A, the conventional case of two diodes in parallel is assumed (curves 42 in interrupted lines and 43 in dotted lines). Their harmonics add and the resultant (curve P in full lines) is of double amplitude. In FIG. 4B, the case of two diodes in antiparallel is assumed (curves 42 in non-continuous lines and 44 in dotted lines). Their harmonics are in phase opposition and cancel (resultant curve AP in full lines confounded with the abscissa axis).

All the diodes can then be biased by means of the same voltages 0 and V1 (preferably, V2=V1) which only need be correctly selected according to the diode direction and to the selected path.

In the example of FIG. 3, this translates as the following table I indicating the voltages selected by switches K1 to K5 and K15, according to the conductive path.

TABLE I

| Path | K1 | K2 | K3 | K4 | K5 | K15 |
|------|----|----|----|----|----|-----|
| Tx1  | V1 | 0  | 0  | V1 | V1 | 0 |
| Tx2  | 0  | V1 | 0  | V1 | V1 | 0 |
| Rx1  | 0  | 0  | V1 | V1 | V1 | 0 |
| Rx2  | 0  | 0  | 0  | 0  | V1 | V2 = V1 |
| Rx3  | 0  | 0  | 0  | V1 | 0  | V2 = V1 |

In receive mode, the harmonics of all the blocked diodes do not compensate. However, the received levels are generally lower so that the harmonics become negligible. Further, there always are two diodes which compensate so that the harmonic level is nevertheless attenuated.

An advantage of the present invention is that it enables attenuating the harmonics generated by the diodes without using additional passive elements or positive or negative bias voltages.

Preferably, identical high-frequency diodes having a stable harmonic rate in the range of voltage drops that they are likely to be applied, are selected. This enables using the same bias voltages (V1 and the ground) for the different paths. For the case where the diodes would be different or would have variable harmonic rates, a correction by the bias voltages is possible.

FIGS. 5A and 5B illustrate the case of diodes which do not all exhibit the same harmonic rates. These drawings show examples of timing diagrams of a sinusoidal signal for two diodes having different harmonic rates for voltages V1-0.7 volt and 0.7 volt. In FIG. 5A, the conventional case of two diodes in parallel (curves 42' in interrupted lines and 43' in doffed lines) is assumed. Their harmonics add (curve P' in hill lines) but are of different amplitudes. In FIG. 5B, the case of two diodes in antiparallel (curve 42' in interrupted lines and 44' in doffed lines) is assumed. The harmonics are in phase opposition, but the resulting signal (curve AP' in full line) is attenuated but does not cancel.

Such an effect can be compensated for by adapting the bias voltages so that all the blocked diodes see the same voltage or voltages sufficiently close for the respective harmonic rates of the diodes to be brought to close levels and to thus compensate. For example, level V1 of switches K4 and K5 is replaced with 2*(V1-0.7). Even if this implies the generation of several voltage levels, it is not necessary to use positive and negative voltages.

FIG. 6 shows a second embodiment of an antenna switch module 60 according to the present invention intended to switch six paths. The first five paths of FIG. 3 (with diodes designated by D61 to D65), to which a path Rx4 (terminal 26, capacitor C6, diode D66, bias circuit L6, K6) has been added, are shown. Since the total number of paths is even, a fictitious path which introduces an additional diode D67 is added to respect the previously-discussed condition. Thus, in this example, the four diodes D61 to D64 have their cathodes interconnected, while three diodes D65 to D67 have their anodes interconnected, diode D67 having its cathode connected, for example to ground by a normalization impedance Z (generally 50 Ω) in series with a capacitor C7. The cathode of diode D67 is always biased to voltage V1 since it must remain blocked. An optional switch K7 has however been shown.

In the example of FIG. 6, it is assumed that the selected path is path Tx2. The ground is selected by switch K15 and voltage V1 is applied to the anode of diode D62, which is thus forward-biased. Diodes D61 to D63 are reverse-biased by having their ground applied to their respective anodes while diodes D65 to D67 are reverse-biased by having voltage V1 applied to their respective cathodes.

Assuming that all diodes are identical and have stable harmonic rates, the operation of antenna switch module 60 of FIG. 6 respects the following table II for the voltage selection by switches K1 to K7 and K15 according to the desired paths.

TABLE II

| Path | K1 | K2 | K3 | K4 | K5 | K6 | K7 | K15 |
|------|----|----|----|----|----|----|----|----|
| Tx1  | V1 | 0  | 0  | 0  | V1 | V1 | V1 | 0 |
| Tx2  | 0  | V1 | 0  | 0  | V1 | V1 | V1 | 0 |
| Rx1  | 0  | 0  | V1 | 0  | V1 | V1 | V1 | 0 |
| Rx2  | 0  | 0  | 0  | V1 | V1 | V1 | V1 | 0 |
| Rx3  | 0  | 0  | 0  | 0  | 0  | V1 | V1 | V2 |
| Rx4  | 0  | 0  | 0  | 0  | V1 | 0  | V1 | V2 |

FIG. 7 shows a third embodiment of the present invention in which antenna switch 70 is said to be "in cascade", that is, a group of paths (for example, receive paths Rx1 to Rx4) has a common diode D78 between an interconnection point 77 of the cathodes of diodes D73 to D76 of the individual paths and common terminal 27 of the switch on the antenna side. In this example, transmit paths Tx1 and Tx2 have diodes D71 and D72 having their anodes interconnected to terminal 27. This embodiment also enables providing an even number of paths by saving, with respect to the solution of FIG. 6, a bias circuit and a capacitor (fictitious path).

As a variation, an additional diode in the same direction as diodes D71 and D72 may be interposed between the common anodes of diodes D71 and D72 and terminal 27 and create a second group, provided for an additional fictitious path (diode 67, FIG. 6) to arrive on terminal 27, to respect the condition of an odd number of diodes directly connected to common terminal 27 of the switch. Creating a group of diodes with common anodes or cathodes eases the diode integration, in groups, on a same substrate.

In the example of FIG. 7, a selection of path Tx1 is assumed. Diode D71 is forward-biased by the ground voltage applied on its cathode, switch K15 selecting voltage V2. Diode D72 is reverse-biased by voltage V1 applied on its cathode. Diodes D73 to D76 and D78 are reverse-biased by the selection of the ground by switches K3 to K6. In such an assembly, voltage V1 must be at least approximately 1.4 volt to turn on the two diodes in series on selection of a receive path (switch K15 then connecting the ground).

Assuming that all the diodes are identical and have stable harmonic rates, the operation of antenna switch module 70 of FIG. 7 respects the following table III for the voltage selection by switches K1 to K6 and K15 according to the desired paths.

TABLE III

| Path | K1 | K2 | K3 | K4 | K5 | K6 | K15 |
|------|----|----|----|----|----|----|-----|
| Tx1  | 0  | V1 | 0  | 0  | 0  | 0  | V2  |
| Tx2  | V1 | 0  | 0  | 0  | 0  | 0  | V2  |
| Rx1  | V1 | V1 | V1 | 0  | 0  | 0  | 0   |
| Rx2  | V1 | V1 | 0  | V1 | 0  | 0  | 0   |
| Rx3  | V1 | V1 | 0  | 0  | V1 | 0  | 0   |
| Rx4  | V1 | V1 | 0  | 0  | 0  | V1 | 0   |

An advantage of the present invention is that it solves the problem of reverse-biased diode harmonics without for all this increasing the number of passive components.

Another advantage of the present invention is that the other features of the antenna switch module and especially the insertion losses and the isolation features, are not altered.

Of course, the present invention is likely to have various alterations, modifications, and improvements which will readily occur to those skilled in the art. In particular, the selection of the bias voltages according to the application is within the abilities of those skilled in the art based on the functional indications given hereabove. For example, the present invention easily transposes to all negative bias voltages. Similarly, the distribution of the diodes with common anodes and common cathodes in the antenna switch module may be modified provided that, when a transmit path (Tx1, Tx2) is selected, the number (at least 1) of diodes of the other paths having their anodes connected to the common terminal on the antenna side is equal to the number (at least 1) of diodes of the other paths having their cathodes interconnected to this common terminal.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An antenna switch module comprising several radio-frequency paths, each of the radio-frequency paths comprising a signal path between a common terminal on an antenna side and a transmit terminal or a receive terminal and further comprising at least one diode in the signal path between the common terminal and the transmit terminal or the receive terminal, wherein the number of said diodes directly connected to said common terminal is odd, the number of said diodes having their cathode on the common terminal side being equal, with a difference of one, to the number of said diodes having their anode on the common terminal side.

2. The switch of claim 1, wherein the diodes are distributed so that, when a transmit path is selected, the number of diodes of the other paths having their anodes connected to the common terminal is equal to the number of diodes of the other paths having their cathodes connected to the common terminal.

3. The switch of claim 2, wherein each bias circuit selects one voltage out of two.

4. The switch of claim 3, wherein the two bias voltages are identical for all paths.

5. The switch of claim 3, wherein the bias voltage of the diodes having their anodes connected to the common terminal is greater than the bias voltage of the diodes having their cathodes connected to the common terminal.

6. The switch of claim 1, wherein each path comprises a circuit for biasing the diode which is associated thereto to only bias it forward when this path is selected.

7. The switch of claim 6, wherein a bias circuit connects the common terminal to a voltage compatible with the conduction of the diode of the selected path.

8. The switch of claim 1, wherein at least one of said diodes connected to said common terminal is common to a first group of paths, each path in the group comprising a diode which is specific thereto between its access terminal and said common diode.

9. An antenna switch module comprising:
a common terminal on an antenna side of the antenna switch module; and
a plurality of radio-frequency paths coupled to the common terminal, each of the radio-frequency paths comprising a transmit signal path or a receive signal path and including at least one diode in the radio-frequency path between the common terminal and a transmit terminal or a receive terminal, wherein a number of said diodes directly connected to the common terminal is odd and wherein a number of said diodes directly connected to the common terminal and having their cathode on a common terminal side differs by one from a number of said diodes directly connected to the common terminal and having their anode on the common terminal side.

10. An antenna switch module as defined in claim 9, wherein the diodes are configured such that when a transmit signal path is selected, the number of diodes of other paths having their anodes connected to the common terminal is equal to the number of diodes of other paths having their cathodes connected to the common terminal.

11. An antenna switch module as defined in claim 9, wherein each radio-frequency path includes a bias circuit to forward bias the diode in response to a selection signal.

12. An antenna switch module as defined in claim 11, wherein the bias circuit connects the common terminal to a voltage suitable for conduction of the diode of the selected path.

13. An antenna switch module as defined in claim 9, wherein at least one of the diodes connected to the common terminal is common to a group of radio-frequency paths.

* * * * *

UNITED STATES PATENT AND TRADEMARK OFFICE
CERTIFICATE OF CORRECTION

PATENT NO. : 7,589,602 B2  Page 1 of 1
APPLICATION NO. : 11/490740
DATED : September 15, 2009
INVENTOR(S) : Patrick Poveda et al.

It is certified that error appears in the above-identified patent and that said Letters Patent is hereby corrected as shown below:

Col. 5, line 64 should read:
dotted lines) is assumed. Their harmonics add (curve P' in full line 67 should read:
44' in dotted lines) is assumed. The harmonics are in phase Signed and Sealed this Twenty-seventh Day of October, 2009

David J. Kappos
*Director of the United States Patent and Trademark Office*